Oct. 2, 1928.
N. D. OLSEN
1,686,497
SECURING MEANS FOR DETACHABLE HANDLES
Filed March 25, 1927
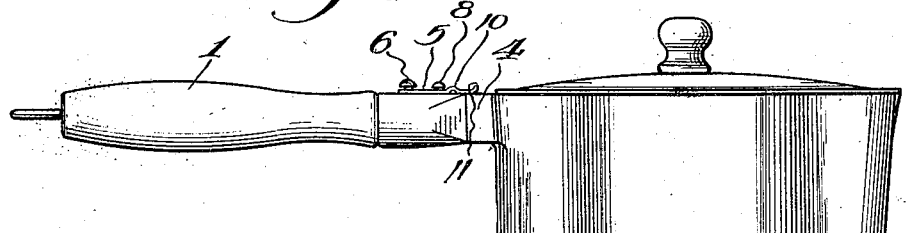
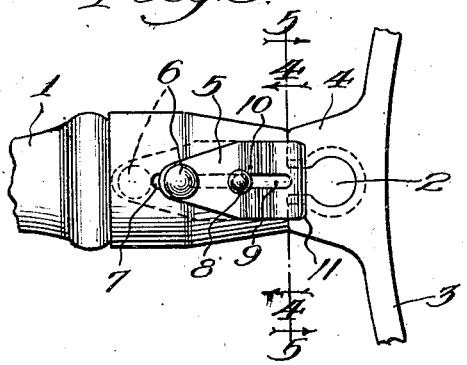
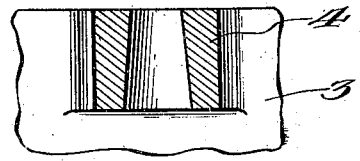
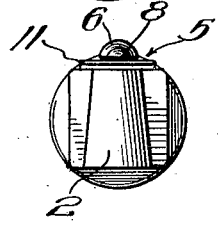
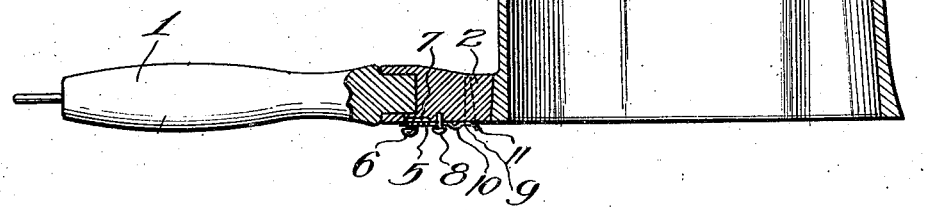
Inventor:
Norman D. Olsen
James R. McKnight
Atty Patented Oct. 2, 1928.

1,686,497

UNITED STATES PATENT OFFICE.

NORMAN D. OLSEN, OF CHICAGO, ILLINOIS, ASSIGNOR TO ACME ALUMINUM FOUNDRY COMPANY, OF CHICAGO, ILLINOIS, A CORPORATION OF ILLINOIS.

SECURING MEANS FOR DETACHABLE HANDLES.

Application filed March 25, 1927. Serial No. 178,297.

My invention relates to improvements in means for securing detachable handles to the articles for which said handles are attached and among the objects of my invention are the following:

Utensils for holding material such as cooking utensils, glue pots, chemical vessels and the like are often equipped with lugs to hold a detachable handle. When said handle of the ordinary variety, such as the tapered lug variety, is affixed to the utensil it is safe to hold the vessel in the usual upright position, but if the user desires to pour material from the utensil, and turns the same sideways and upside down, the handle slips off and causes loss of material and other damage.

My invention is to obviate such occurrences as above described, namely:—

To provide a securing means for a detachable handle so that the utensil may be turned sideways, upside down or in any position and still be firmly held by the securing means.

To create a device for gripping a detachable handle to a utensil with ease, facility and with dependable and positive fastening quality regardless of the position of the utensil.

To afford a securing means operable simply by operation of the hand or the like of the user so that the same may be fastened or unfastened, and such other objects, advantages and capabilities as will later more fully appear.

While I have shown in the accompanying drawings a preferred embodiment of my invention, yet I wish it understood that the same is susceptible of modification and change without departing from the spirit of my invention.

Referring to the drawings:

Fig. 1 is an elevational side view of my securing means in locked position.

Fig. 2 is a cross sectional view showing the securing mechanism in secured position with the utensil held upside down.

Fig. 3 is an enlarged plan view of my fastening means.

Fig. 4 is a sectional view on line 4—4 of Fig. 3.

Fig. 5 is a sectional view on line 5—5 of Fig. 3.

My invention more in detail comprises a handle 1 having a rounded and tapered end portion 2. Said handle 1 is adapted to be detachably affixed to a pan 3 by placing said rounded and tapered portion 2 up and into a pair of spaced lugs 4 adjacent said pan 3. Said portion 3 and lugs 4 are tapered upwardly so that the smaller portion of the taper is at the top of 2 and the larger opening space between the lugs is at the bottom of 4, thus allowing easy entrance of the portion 2. As the portion 2 is lifted it fits into the narrow part of the space between lugs 4 at the top and thus holds the handle 1 to the pan 3. However, as shown in Figs. 4 and 5, it will be easily seen that if the pan 3 were held in the position shown in Fig. 2 the portion 2 would be forced down to the wide space at the bottom of lug 4 and permit the pan to be detached.

In order to prevent said pan 3 from detaching from said handle 1 when said pan 3 is held upside down, I employ a sliding plate 5 which is slidably affixed to said handle 1 by a bolt 6. Said bolt 6 is anchored in a slot 7 to hold said sliding plate 5 against side movement. Said bolt 6 is also usable as a thumb means or the like, to slide said sliding plate backwards and forwards. Said sliding plate normally is held in retracted position and therefore unfastened. A stop means 8 is affixed to said handle 1 and operates in a slot 9. There is a ridge 10 on said sliding plate 5 to hold said sliding plate in the fixed desired position. Said ridge acts as a friction means. Said sliding plate 5 has a lip 11, which when pushed forward by means of bolt 6, extends over the edge of lugs 4 when the handle 1 is attached to pan 3 and prevents said pan 3 from falling off when so positioned.

It is of course understood that the specific description set forth above may be departed from without departing from the spirit of my invention as set forth in this specification and the appended claims.

Having now described my invention I claim:

1. A detachable securing handle combination comprising a vessel, a pair of spaced lugs attached to the outside of said vessel, said lugs widely spaced at their bottom portion and gradually narrowing to their top portion, a handle, a rounded end on said handle having a narrow top portion and a comparatively wide bottom portion, said end portion being adapted to fit in between said spaced lugs, a slidable plate fixed to said handle, a thumb means for actuating said slidable plate, and a lip on said slidable plate adapted to slide over the top of said spaced lugs and end portion of the handle.

2. In combination a vessel, a pair of spaced lugs attached to said vessel, a handle having a rounded and tapered end portion adapted to fit into and between said spaced lugs, a plate slidably fixed to said handle, said plate having a slot, a bolt member to move said plate backward and forward but to prevent side movement, a friction portion on said plate, a stop member attached to said plate and a lip portion of said plate adapted to extend over the edge of said lugs.

In witness whereof, I hereunto subscribe my name to this specification.

NORMAN D. OLSEN.